(12) United States Patent
Montenegro et al.

(10) Patent No.: US 7,434,051 B1
(45) Date of Patent: Oct. 7, 2008

(54) METHOD AND APPARATUS FOR FACILITATING SECURE COCKTAIL EFFECT AUTHENTICATION

(75) Inventors: Gabriel Montenegro, Meylan (FR); Damine Bailly, Grenoble (FR)

(73) Assignee: Sun Microsystems, Inc., Santa Clara, CA (US)

( * ) Notice: Subject to any disclaimer, the term of this patent is extended or adjusted under 35 U.S.C. 154(b) by 750 days.

(21) Appl. No.: 10/674,940

(22) Filed: Sep. 29, 2003

(51) Int. Cl.
*H04L 9/00* (2006.01)
*H04L 9/32* (2006.01)

(52) U.S. Cl. .............................. 713/170; 726/5; 380/33
(58) Field of Classification Search ................ 713/150, 713/161, 170; 726/3; 380/33
See application file for complete search history.

(56) References Cited

U.S. PATENT DOCUMENTS

| | | | | |
|---|---|---|---|---|
| 5,872,847 | A * | 2/1999 | Boyle et al. ................. | 713/170 |
| 6,263,437 | B1 * | 7/2001 | Liao et al. ................... | 713/170 |
| 7,003,497 | B2 * | 2/2006 | Maes ......................... | 713/150 |
| 2003/0120924 | A1 * | 6/2003 | Immonen .................... | 713/170 |
| 2007/0005962 | A1 * | 1/2007 | Baker ......................... | 713/168 |

* cited by examiner

*Primary Examiner*—Gilberto Barron, Jr.
*Assistant Examiner*—Laurel Lashley
(74) *Attorney, Agent, or Firm*—Park, Vaughan & Fleming LLP

(57) ABSTRACT

One embodiment of the present invention provides a system that facilitates confirmation of data communicated to a first device belonging to a first user from a second device belonging to a second user. During operation, the first device receives a message containing data from the second device. The first device then translates the data into a string of words (such as a human-friendly representation using a well-known function such as the One Time Password (OTP) dictionary defined in IETF RFC 1938) that can be recognized by a human. Next, the first device displays the string of words to the first user. The second device also translates the original data using the same well-known function. The first user and the second user then confirm that both strings of words match. The confirmation process is performed through a separate communication channel. This confirmation process ensures that the data sent by the second device is successfully received by the first device, and that it was sent by the second device. That is, this confirmation process provides both integrity checking and authentication on the data sent from the second device to the first device.

27 Claims, 4 Drawing Sheets

METHOD AND APPARATUS FOR FACILITATING SECURE COCKTAIL EFFECT AUTHENTICATION

BACKGROUND

1. Field of the Invention

The present invention relates to security mechanisms in communication networks. More specifically, the present invention relates to a method and an apparatus for authenticating data that is transmitted across a public network.

2. Related Art

Dramatic advances in computer technology presently make it possible to integrate a significant amount of computing power into small portable computing devices, such as cell phones and personal digital assistants (PDAs). This has led to a proliferation of networked devices over the past few years. Due to a large increase in the number of networked devices, the Internet Protocol version 4 (IPv4) address space, which is based on a 32-bit long address format, will soon run out of usable addresses. To solve this problem, Internet Protocol version 6 (IPv6) was proposed. IPv6 defines a 128-bit long address format, which is believed to provide a sufficient number of addresses to accommodate all networked devices.

As larger numbers of devices are able to communicate with each other across the Internet, a number of security threats can arise. One issue is the address ownership problem: how does one prove that a device legally owns an address (i.e., that the device is not stealing an address belonging to another device)?

A recently proposed Crypto-Based Identifier (CBID) scheme can be used to remedy this problem. CBIDs are derived from cryptographic keys. For example, a given device in a network can be associated with a unique private-public key pair, and the CBID can be derived from the public key. This derivation process can involve performing a secure hash on the device's public key and combining the result of the hash function with the device's network address to produce a CBID. As a result, a CBID can be verifiably associated with the device's public key and at the same time can contain address information of the device. The fact that a CBID contains both identification (i.e., part of the hash of the public key) and address information of a device allows one to verify the device's ownership of the address it is using.

However, verifying that a device owns an address it is using is not sufficient to bootstrap secure communications between end users. The problem can be illustrated by the following example: a user Alice uses device A, which is connected to the network, and she would like to establish communication with another user Bob using device B, which is connected to the same network. How can Alice be sure that she is communicating with Bob's device and not with any other device on the network (although she can be sure that device B legally owns the address it is using)? Alice and Bob may be thought of as being at a "cocktail party," where any communications between device A and device B can be observed by any other devices at the same party. Moreover, there may be other cocktail party participants who are willing to publish their identifiers and to eavesdrop on the exchange between Alice and Bob. A malicious user operating a device, which legally owns the network address it is using, could pretend to be Bob and could hijack the traffic from Alice that is intended to go to Bob. Consequently, in order to bootstrap secure communications, one needs not only address-ownership verification, but also "user authentication," which establishes a user's ownership of a device and thereby maps the device to the user.

User authentication can be accomplished through the public key infrastructure. However, one cannot always assume that the public key infrastructure is available. For example, when two users wish to communicate with each other through wireless devices, and the area they are located in does not have any wireless connectivity to the Internet, neither of the devices can access to an Internet-based public key infrastructure.

In the absence of a public key infrastructure, an alternative approach is to use existing authenticated (but not necessarily secret) human communication channels, such as visual or audio communications, to authenticate users and to bootstrap secure communications. For example, if Alice wishes to communicate with Bob through wireless devices in a public place, Alice's device needs to identify Bob's device. To achieve this, Bob can verbally communicate to Alice his device's address or identifier, which can be represented as a string of symbols, and Alice can then enter this string of symbols into her device. Although this process can be used to bootstrap secure communications between wireless devices, having a human enter a string of symbols into a device is a tedious and error-prone process, especially with 128-bit long IPv6 addresses.

Hence, what is needed is a method and an apparatus for authenticating users, in the absence of a public key infrastructure, and without requiring a user to enter a long string of symbols.

SUMMARY

One embodiment of the present invention provides a system that facilitates confirmation of data communicated to a first device belonging to a first user from a second device belonging to a second user. During operation, the first device receives a message containing data from the second device. The first device then translates the data into a string of words (such as a human-friendly representation using a well-known function such as the One Time Password (OTP) dictionary defined in IETF RFC 1938) that can be recognized by a human. Next, the first device displays the string of words to the first user. The second device also translates the original data using the same well-known function. The first user and the second user then confirm that both strings of words match. The confirmation process is performed through a separate communication channel. The confirmation ensures that the data sent by the second device is successfully received by the first device, is authentic, and is integrity-checked.

In a variation of this embodiment, prior to receiving the message, the first device broadcasts a request asking for the data from the second device.

In a variation of this embodiment, the message received by the first device is signed with a private key corresponding to a public key associated with the second device. In this variation, the system uses the public key associated with the second device to verify that the message is signed with the private key associated with the second device.

In a variation of this embodiment, while receiving the message, the first device receives more than one message. The first device translates data in the other messages into corresponding strings of words which can be recognized by a human, and displays these strings to the first user, thereby allowing the first user to match one of these strings of words with the corresponding string derived by the second device from the original data.

In a variation of this embodiment, prior to the reception of the message at the first device, the first user obtains a portion of the digest (or translation) on a separate communication channel and enters this portion into the first device. The first device subsequently uses this portion to filter messages.

In a variation of this embodiment, the data received at the first device contains a cryptographically generated address (CGA) belonging to the second device. This CGA is generated by: performing a hash function on the second device's public key (or corresponding certificate), and then combining a portion of the hash result with a prefix of the devices's IPv6 address.

In a variation of this embodiment, the translation uses a one-time password (OTP) dictionary.

In a variation of this embodiment, the request includes a CBID belonging to the first device, and the request is signed with a private key associated with the first device, thereby allowing the request to be verifiably associated with the first device.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and does not include computer instruction signals embodied in a transmission medium.

User Authentication

Figure 1A:
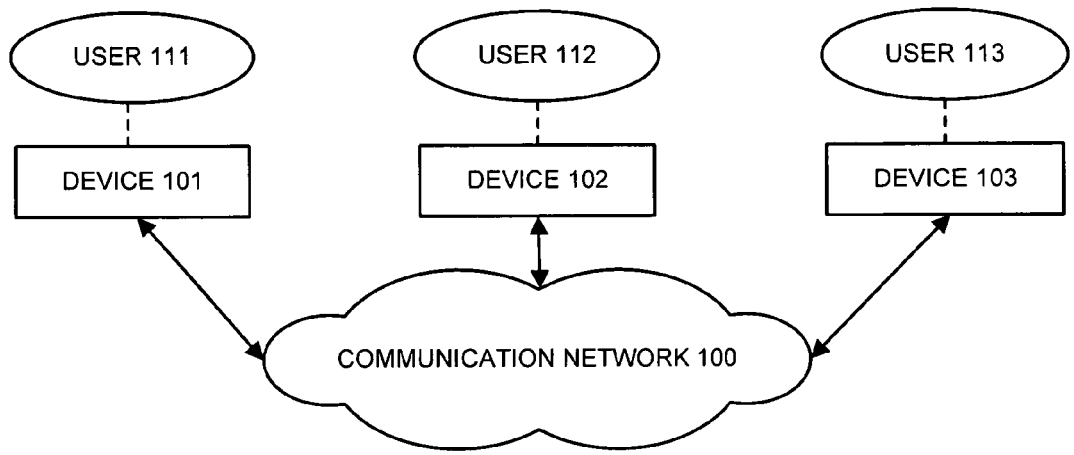
FIGS. 1A and 1B illustrate a communication network with multiple devices and multiple users, and how a user can be authenticated through a separate communication channel in accordance with an embodiment of the present invention.

FIG. 1A illustrates a communication network 100 with multiple devices and multiple users. A device can include any wired or wireless communication device, such as a computer, a PDA, a cell phone, etc. As shown in FIG. 1, devices 101, 102, and 103 belong to users 111, 112, and 113, respectively. When user 111 wants to initiate secure communication with user 113, user 111 ideally ensures: (1) that the destination address being used belongs to device 103 (the address ownership problem); and (2) that device 103 belongs to user 113 (the user authentication problem).

The address ownership problem can be addressed by using a CBID to map a device's identifier to the public key associated with the device. This mapping relationship provided by the CBID can prove the device's ownership of the identifier because the owner of the identifier is the only one who has access to the corresponding private key.

Figure 1B:
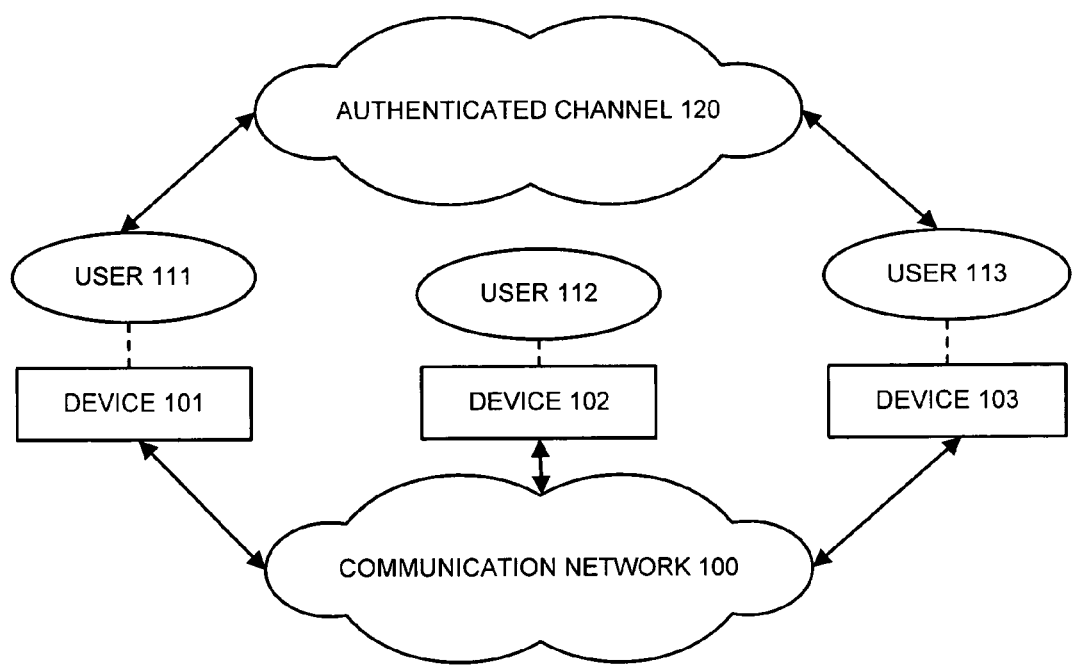

FIG. 1B illustrates how user authentication can be accomplished through a separate communication channel. When user 111 receives device 103's CBID, which is 128 bit long, user 111 still needs to confirm that device 103 belongs to user 113. At this point, device 101 translates the received CBID into a string of words that can be recognized by a human, and displays these words to user 111. (The translation process can use a One Time Password (OTP) dictionary defined in IETF RFC 1938. The OTP dictionary maps any 11-bit number to a human-recognizable word.) Meanwhile, user 113 communicates the same string of words, which is translated from device 103's CBID, to user 111 through a separate, authenticated human communication channel 120 (e.g., face-to-face communication, phone conversation, visual contacts, etc.). User 111 then compares the words received through channel 120 with the words displayed on device 101. If the two strings match, user 111 can be confident that user 111 is indeed communicating with a device belonging to user 113.

CBID Construction

Figure 2:
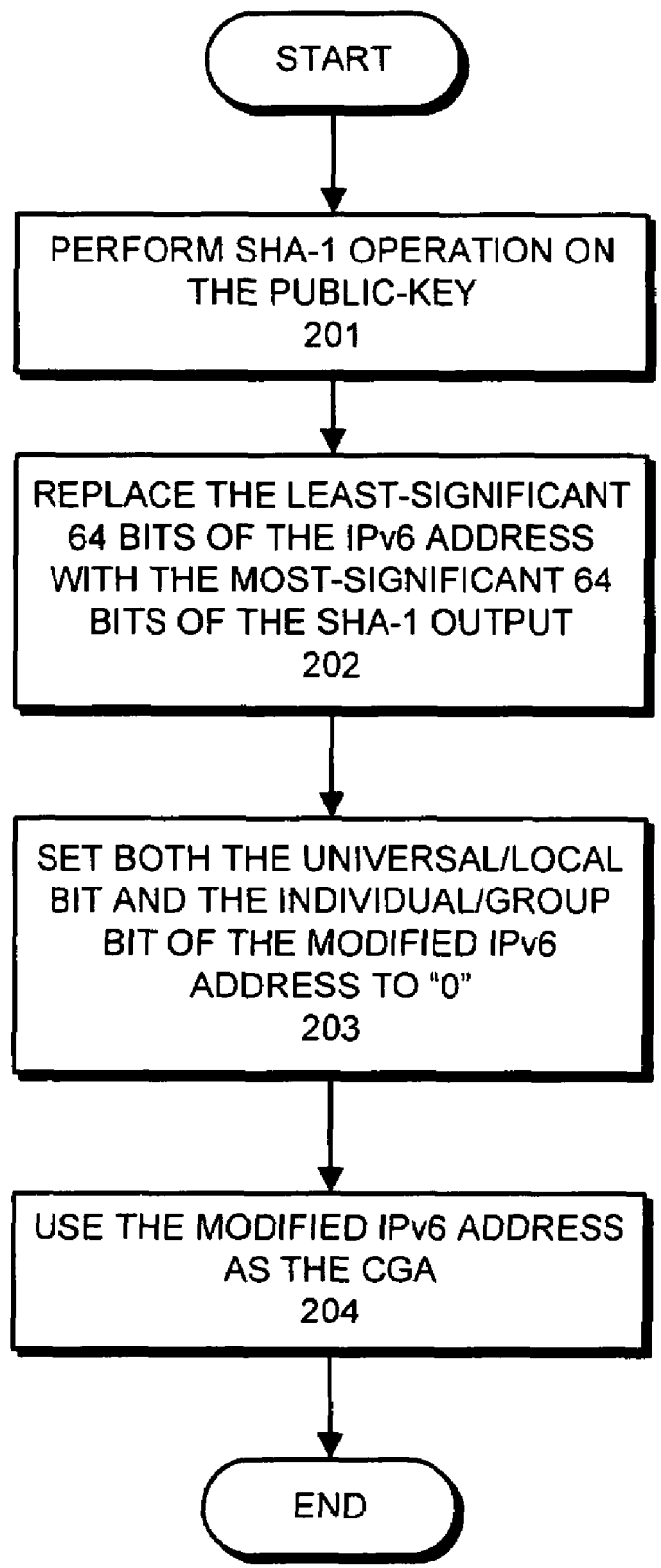
FIG. 2 presents a flow chart illustrating how a cryptographically generated address (CGA) can be derived by performing a hash function on a public-key in accordance with an embodiment of the present invention.

FIG. 2 presents a flow chart illustrating how a cryptographically generated address (CGA) can be derived by performing a hash function on a public-key in accordance with an embodiment of the present invention. The system first feeds a public-key into a secure hash algorithm (SHA-1), which produces a 160-bit result (step 201). A corresponding CBID uses, say, 128 bits out of that (for example, in an IPv6 ad hoc scenario or in JXTA, the peer-to-peer platform).

To create a CGA the most-significant 64 bits of the result can be used to replace the least-significant 64 bits of the IPv6 address of the device (step 202). The system then sets the universal/local bit ("u" bit) and the individual/group bit ("g" bit) of the IPv6 address to "0", indicating that this is a cryptographic IPv6 address (step 203). This modified IPv6 address is then used as the CGA of the device (step 204).

Bootstrapping Process

Figure 3A:
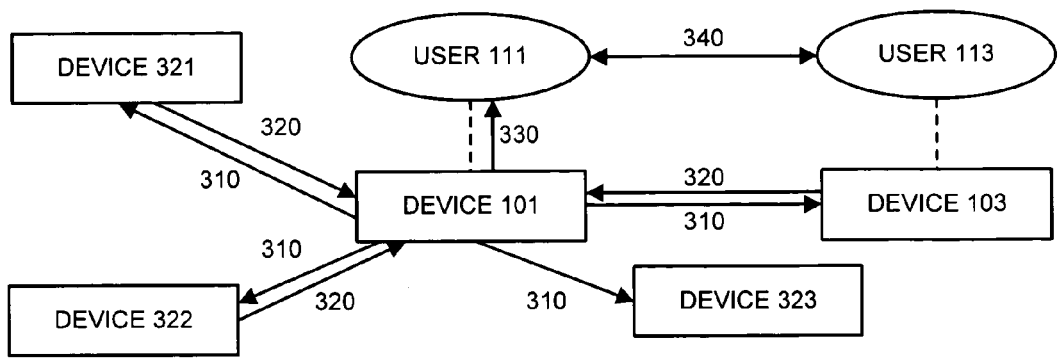
FIG. 3 presents a diagram illustrating the process of user authentication for bootstrapping secure communications between users in accordance with an embodiment of the present invention.
Figure 3B:
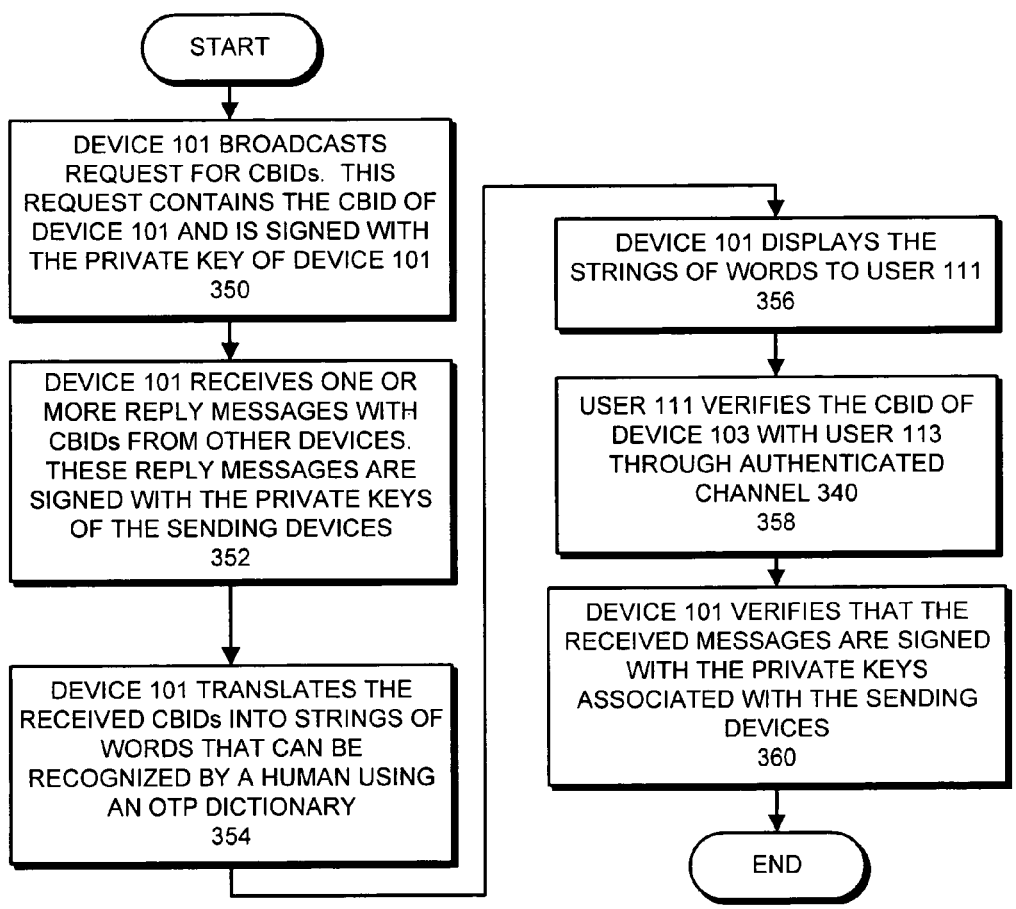

FIG. 3 presents a diagram and a corresponding flow chart illustrating the process of user authentication for bootstrapping secure communications between users in accordance with an embodiment of the present invention. Device 101 belonging to user 111 starts by sending out a broadcast message to other devices (devices 321, 322, 323, and 103 in this example) requesting their CBIDs, wherein the request can contain the CBID of device 101 and can be signed with the private key of device 101 (step 350). Device 101 then receives one or more response messages from a number of devices, including device 103 (step 352). The received messages can be signed with the private keys of the sending devices. Note that these response messages can also include responses from malicious users trying to impersonate user 113.

Next, device 101 translates the received CBIDs into strings of human-recognizable words using an OTP dictionary (step 354), and displays the strings of words to user 111 (step 356). User 111 then confirms with user 113 (through a separate authenticated communication channel 340) that one string of words displayed on device 111 matches with a string of words translated from device 103's CBID (step 358). In this way, user 111 can confirm that device 103 belongs to user 113. Device 101 then verifies the received messages, which are signed with private keys of the sending devices, using the public keys associated with the corresponding sending devices (step 360).

Note that, during the entire bootstrapping process, there is no need for a user to manually enter a 128-bit long CBID, which is a tedious and error-prone process. Instead, the bootstrapping process only requires the user to recognize (not enter) words. Note that humans are better suited to recognizing words than entering long strings of symbols.

Message Filtering

Figure 4:
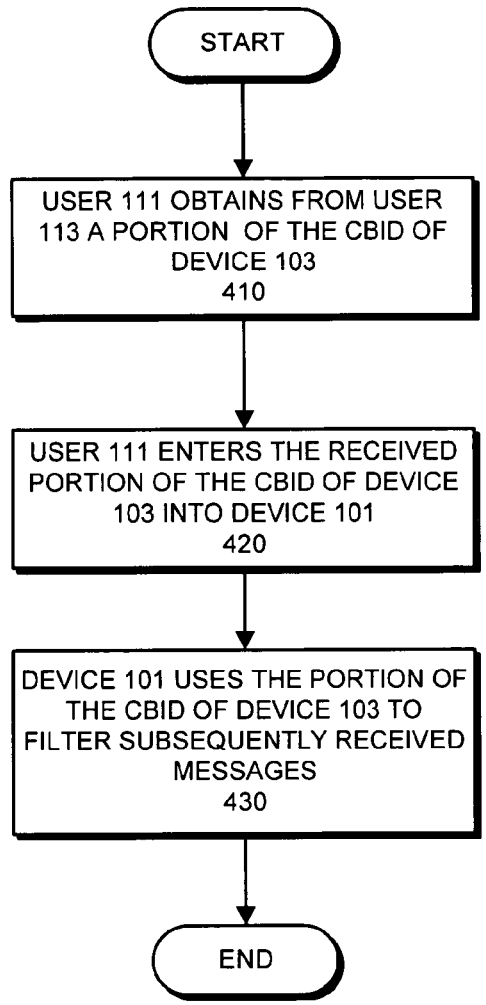
FIG. 4 presents a flow chart illustrating how a device can filter unwanted received messages containing CBIDs in accordance with an embodiment of the present invention.

FIG. 4 presents a flow chart illustrating how a device can filter unwanted received messages in accordance with an embodiment of the present invention. To allow message filtering, user 111 first obtains from user 113 a portion (e.g., a number of leading bits) of the CBID (or hash of the data) of device 103, which belongs to user 113 (step 410). This portion of the CBID can be represented by words translated with the OTP dictionary to facilitate human communications. User 111 then enters this portion of the CBID into device 101 (step 420). Device 101 can subsequently use this portion of the CBID to filter out received messages containing CBIDs and can display the filtered messages to user 111 (step 430).

Response Message Format

Figure 5:
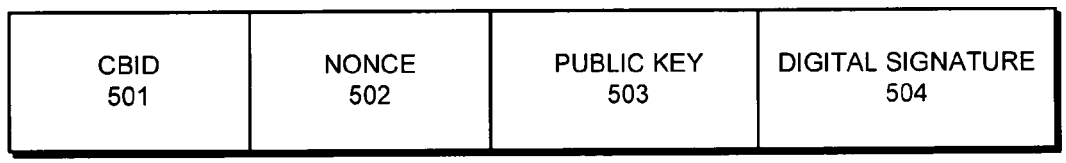
FIG. 5 illustrates an example response message format in accordance with an embodiment of the present invention.

FIG. 5 illustrates an example response message format in accordance with an embodiment of the present invention. A response message can contain a device's CBID 501, a nonce 502, its public key 503, and a digital signature 504 of the entire message based on the private key associated with the device. Nonce 502 can be a random number previously sent as a challenge in a request message from a requesting device. By including nonce 502 in the response message and signing the message with its private key, a responding device allows the requesting device to verify that the responding device signed the nonce with the private key, and is not simply replaying an intercepted message that was signed with the private key.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for confirming communication of data to a first device belonging to a first user from a second device belonging to a second user, the method comprising:
receiving a message containing data from the second device at the first device;
translating the data into a string of dictionary words that can be recognized by a human;
allowing the second device to translate the data into a corresponding string of dictionary words;
displaying the string of dictionary words to the first user; and
allowing the first user and the second user to confirm a match between the string of dictionary words from the first device and the corresponding string of dictionary words from the second device, wherein the confirmation process is performed through a separate communication channel, and wherein the confirmation ensures that the data sent by the second device is successfully received by the first device, is authentic, and is integrity-checked.

2. The method of claim 1, wherein prior to receiving the message, the first device broadcasts a request asking for the second device's data, and wherein the data can be an identifier.

3. The method of claim 1,
wherein the message received by the first device is signed with a private key corresponding to a public key associated with the second device; and
wherein the method further comprises using the public key associated with the second device to verify that the message is signed with the private key associated with the second device.

4. The method of claim 1,
wherein while receiving the message, the first device receives more than one message; and
wherein the method further comprises translating the data in the other messages into strings of dictionary words which can be recognized by a human, and displaying these strings of dictionary words to the first user, thereby allowing the first user to match one of these strings of dictionary words with the corresponding string derived by the second device from the original data.

5. The method of claim 1, wherein prior to the reception of the message at the first device, the first user obtains a portion of the hash of the data on a separate communication channel and enters this portion into the first device, and wherein the first device uses this portion to filter subsequently received messages.

6. The method of claim 1, wherein the data received at the first device contains a cryptographically generated address (CGA) belonging to the second device, which is generated by:
performing a hash function on the second device's public key; and
constructing the CGA by combining a number of bits of an address belonging to the second device and a number of bits from the result of the hash function.

7. The method of claim 6,
wherein the message received by the first device includes a public key associated with the second device; and
wherein the method further comprises performing a hash function on the public key to verify the association between the CGA and the public key associated with the second device.

8. The method of claim 1, wherein the translation uses a one-time password (OTP) dictionary.

9. The method of claim 2,
wherein the request includes a Crypto-Based Identifier (CBID) belonging to the first device; and
wherein the request is signed with a private key associated with the first device, thereby allowing the request to be verifiably associated with the first device.

10. A computer-readable storage medium storing instructions that when executed by a computer cause the computer to perform a method for confirming communication of data to a first device belonging to a first user from a second device belonging to a second user, the method comprising:
receiving a message containing data from the second device at the first device;
translating the data into a string of dictionary words that can be recognized by a human;
allowing the second device to translate the data into a corresponding string of dictionary words;
displaying the string of dictionary words to the first user; and
allowing the first user and the second user to confirm a match between the string of dictionary words from the first device and the corresponding string of dictionary words from the second device, wherein the confirmation process is performed through a separate communication channel, and wherein the confirmation ensures that the data sent by the second device is successfully received by the first device, is authentic, and is integrity-checked.

11. The computer-readable storage medium of claim 10, wherein prior to receiving the message, wherein prior to receiving the message, the first device broadcasts a request asking for the second device's data, and wherein the data can be an identifier.

12. The computer-readable storage medium of claim 10, wherein the message received by the first device is signed with a private key corresponding to a public key associated with the second device; and
wherein the method further comprises using the public key associated with the second device to verify that the message is signed with the private key associated with the second device.

13. The computer-readable storage medium of claim 10, wherein while receiving the message, the first device receives more than one message; and
wherein the method further comprises translating the data in the other messages into strings of dictionary words which can be recognized by a human, and displaying these strings of dictionary words to the first user, thereby allowing the first user to match one of these strings of dictionary words with the corresponding string derived by the second device from the original data.

14. The computer-readable storage medium of claim 10, wherein prior to the reception of the message at the first device, the first user obtains a portion of the hash of the data on a separate communication channel and enters this portion into the first device, and wherein the first device uses this portion to filter subsequently received messages.

15. The computer-readable storage medium of claim 10, wherein the data received at the first device contains a cryptographically generated address (CGA) belonging to the second device, which is generated by:
performing a hash function on the second device's public key; and
constructing the CGA by combining a number of bits of an address belonging to the second device and a number of bits from the result of the hash function.

16. The computer-readable storage medium of claim 15, wherein the message received by the first device includes a public key associated with the second device; and
wherein the method further comprises performing a hash function on the public key to verify the association between the CGA and the public key associated with the second device.

17. The computer-readable storage medium of claim 10, wherein the translation uses a one-time password (OTP) dictionary.

18. The method of claim 11,
wherein the request includes a Crypto-Based Identifier (CBID) belonging to the first device; and
wherein the request is signed with a private key associated with the first device, thereby allowing the request to be verifiably associated with the first device.

19. An apparatus that confirms communication of data between a first user and a second user, comprising:
a receiving mechanism in a first device belonging to the first user, the receiving mechanism configured to receive a message containing data from a second device belonging to the second user;
a translation mechanism in the first device configured to translate the data into a string of dictionary words that can be recognized by a human;
a display mechanism configured to display the string of dictionary words to the first user; and
a confirmation mechanism that allows the first user and the second user to confirm a match between the string of dictionary words from the first device and a corresponding string of dictionary words translated from the data at the second device, wherein the confirmation process is performed through a separate communication channel, and wherein the confirmation ensures that the data sent by the second device is successfully received by the first device, is authentic, and is integrity-checked.

20. The apparatus of claim 19, wherein prior to receiving the message, the first device is configured to broadcast a request asking for the second device's data, and wherein the data can be an identifier.

21. The apparatus of claim 19,
wherein the message received by the first device is signed with a private key corresponding to a public key associated with the second device; and
wherein the apparatus further comprises a verification mechanism configured to use the public key associated with the second device to verify that the message is signed with the private key associated with the second device.

22. The apparatus of claim 19,
wherein the first device is configured to receive more than one message while receiving the message;
wherein the translation mechanism is further configured to translate the data in the other messages into strings of dictionary words which can be recognized by a human; and
wherein the display mechanism is further configured to display these strings of dictionary words to the first user, thereby allowing the first user to match these string of dictionary words with the corresponding string derived by the second device from the original data.

23. The apparatus of claim 19, wherein prior to the reception of the message at the first device, the first device is configured to enable the first user to obtain a portion of the hash of the data on a separate communication channel and to enter this portion into the first device, and wherein the first device is configured to use this portion to filter subsequently received messages.

24. The apparatus of claim 19, wherein the data received at the first device contains a cryptographically generated address (CGA) belonging to the second device, which is generated by:
performing a hash function on the second device's public key; and
constructing the CGA by combining a number of bits of an address belonging to the second device and a number of bits from the result of the hash function.

25. The apparatus of claim 24,
wherein the message received by the first device includes a public key associated with the second device; and
wherein the apparatus further comprises a verification mechanism configured to perform a hash function on the public key to verify the association between the CGA and the public key associated with the second device.

26. The apparatus of claim 19, wherein the translation mechanism uses a one-time password (OTP) dictionary.

27. The apparatus of claim 20,
wherein the request includes a Crypto-Based Identifier (CBID) belonging to the first device; and
wherein the request is signed with a private key associated with the first device, thereby allowing the request to be verifiably associated with the first device.

* * * * *